United States Patent Office 3,794,480
Patented Feb. 26, 1974

3,794,480
DIETHYNYLBENZYL ALCOHOLS AS HERBICIDES
Robert D. Dillard, Indianapolis, and Donald E. Pavey, Greenwood, Ind., assignors to Eli Lilly and Company, Indianapolis, Ind.
No Drawing. Filed Jan. 25, 1971, Ser. No. 109,704
Int. Cl. A01n 9/24
U.S. Cl. 71—122               5 Claims

ABSTRACT OF THE DISCLOSURE

Herbicidal compositions and methods in which an α,α-diethynylbenzyl alcohol or an ester thereof is the herbicidally active ingredient, employed pre-emergently.

BACKGROUND OF THE INVENTION

α,α-diethynylbenzyl alcohol is described by Noltes and Van der Kerk, Rec. Trav. Chim., 81, 41–8 (1962).

SUMMARY

This invention provides a herbicidal method in which a compound according to the following formula is applied pre-emergently to a locus containing plant seeds and/or germinating plants:

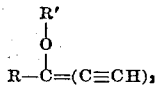

wherein R is phenyl, 2,4-xylyl,

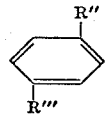

wherein R″ is halo, trifluoromethyl, or $C_1$–$C_3$ alkyl and R‴ is halo, hydrogen or $C_1$–$C_3$ alkyl, or

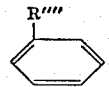

wherein R″″ is halo, $C_1$–$C_3$ alkyl or $C_1$–$C_3$ alkyloxy, and wherein R′ is hydrogen, $C_1$–$C_4$ alkanoyl or cyclopropane carboxyl.

Illustrative of the term "halo" are: fluoro, chloro, bromo, and iodo. The term "$C_1$–$C_3$ alkyl" includes: methyl, ethyl, isopropyl, and n-propyl. The term "$C_1$–$C_4$ alkanoyl" includes: acetyl, propionyl, and butyryl. The term "$C_1$–$C_3$ alkoxy" includes methoxy, ethoxy, isopropoxy, and n-propoxy.

Compounds coming within the scope of the above formula include the following:

α,α-Diethynyl-2-isopropylbenzyl alcohol
α,α-Diethynyl-3-n-propoxybenzyl acetate
α,α-Diethynyl-3-methoxybenzyl alcohol
α,α-Diethynyl-2-methyl-5-iodobenzyl alcohol
α,α-Diethynyl-2-fluoro-5-methylbenzyl acetate
α,α-Diethynyl-2-chloro-5-isopropylbenzyl alcohol
α,α-Diethynyl-2,5-dichlorobenzyl alcohol
α,α-Diethynyl-2-ethylbenzyl isobutyrate
α,α-Diethynyl-3-methylbenzyl alcohol
α,α-Diethynyl-2-n-propylbenzyl butyrate
α,α-Diethynyl-2-fluorobenzyl alcohol
α,α-Diethynyl-3-bromobenzyl alcohol
α,α-Diethynyl-2-trifluoromethylbenzyl propionate
α,α-Diethynyl-2-methyl-5-bromobenzyl alcohol
α,α-Diethynyl-2,5-dimethylbenzyl acetate
α,α-Diethynyl-2-iodobenzyl alcohol As previously stated, the α,α-diethynylbenzyl alcohols and esters represented by the above formula have herbicidal activity, particularly when applied pre-emergently to areas infested with plant seeds and/or plant seedlings. This activity is illustrated by the following greenhouse trials wherein compounds according to the above formula were evaluated as pre-emergent herbicides against 20 plant species including both weeds and crops, using the following procedure: A soil was prepared consisting of one part masonry sand and one part shredded top soil blended together in a cement mixer. A 21.5 x 31.5 x 8 cm. galvanized flat was filled with one gallon each of this soil mixture and the soil patted down with a bench brush until level. The seeds were planted in rows parallel to the long axis, one species per half-row. The plant species used and approximate number of seeds planted were as follows:

Large crabgrass (*Digitaria sanguinalis*) 250
Pigweed (*Amaranthus retroflexus*) 250
Barnyard grass (*Echinochloa crusgalli*) 50
Lambsquarter (*Chenopodium album*) 100
Cocklebur (*Xanthium pennsylvanicum*) 6
Mustard (Brassica sp.) 125
Velvetleaf (*Abutilon theophrasti*) 50
Wild Oat (*Avena fatua*) 25
Foxtail millet (*Setaria italica*) 100
Morning glory (*Ipomoea purpurea*) 8
Corn (*Zea mays*) 4
Cotton (*Gossypium hirsutum*) 5
Soybean (*Glycine max*) 5
Rice (*Oryza sativa*) 35
Sugar beet (*Beta vulgaris*) 25
Zinnia (*Zinnia elegans*) 20
Cucumber (*Cucumis sativus*) 8
Wheat (*Triticum aesitivum*) 40
Alfalfa (*Medicago sativa*) 175
Tomato (*Lycopersicon esculentum*) 45

Two flats (10 species each) were used for each application rate of each herbicidally active compound.

In assaying the effect of the compositions as preemergent herbicides, a flat prepared as above, either on the day of planting or on the next day, was placed in a chamber equipped with turntable and air exhaust. The compounds were formulated for tests as follows: Each compound was dissolved in acetone and ethanol (1:1 ratio) containing a small amount of a surfactant blend containing three parts of the calcium salt of myristylbenzene sulfonic acid to one part of the oleate ester of a polyoxyethylene glycol (M.W.=350) or a surfactant blend containing seven parts of the calcium salts of laurylphenolsulfonic acid to three parts of mono- and di-resin acid esters of polyoxyethylene glycol (M.W.=500). The volume of solvent was 10 percent of the final spray volume. The solution was then diluted with deionized water to 12.5 ml. and applied to each flat with a modified De Vilbiss atomizer hooked to an air source, either on the day of planting or the succeeding day.

Injury ratings and observations as to type of injury were made eleven to twelve days after treatment. The injury rating scale used was as follows:

0—no injury
1—slight injury
2—moderate injury
3—severe injury
4—death

When more than one determination was carried out, an average value was calculated for the injury rating.

The results of the above trials are set forth in Table I which follows. In the table column 1 gives the name of the compound under test; column 2, the rate in pounds per acre at which the compound was applied to the test flat; and the remaining columns, the injury rating for the particular plant seeds or seedlings.

TABLE 1

$$R-\overset{\overset{\displaystyle O}{\|}}{C}-(C=CH)_2$$
$$\phantom{R-C-(C=}\overset{|}{R'}$$

| R | R' | Rate, lbs./A. | Corn | Cotton | Soybean | Wheat | Alfalfa | Sugarbeet | Rice | Cucumber | Tomato | Barnyard grass | Lambsquarter | Cocklebur | Large Crabgrass | Mustard | Pigweed | Foxtail | Wild oat | Velvet leaf | Morning glory | Zinnia |
|---|---|---|---|---|---|---|---|---|---|---|---|---|---|---|---|---|---|---|---|---|---|---|
| Phenyl | H | 8 | 2 | 4 | 2 | — | — | — | — | 3 | — | — | — | — | 2 | 2 | 4 | 2 | — | 3 | — | — |
|  |  | 4 | 1 | 2 | 2 | — | — | — | — | 3 | — | — | — | — | 1 | 2 | 4 | 1 | — | 2 | — | — |
|  |  | 2 | 1 | 0 | 0 | — | — | — | — | 1 | — | — | — | — | 1 | 1 | 0 | 0 | — | 0 | — | — |
|  |  | 1 | 2 | 0 | 0 | — | — | — | — | 2 | — | — | — | — | 3 | 1 | 3 | 3 | — | 0 | — | — |
| 2-fluorophenyl | H | 8 | 1 | 2 | 1 | 1 | 4 | 2 | 1 | 3 | 2 | — | 1 | — | 0 | 1 | 4 | 0 | 1 | 4 | 4 | 4 |
|  |  | 4 | 0 | 1 | 0 | 0 | 4 | 3 | 0 | 1 | 2 | 0 | 0 | 0 | 0 | 1 | 4 | 0 | 0 | 1 | 4 | 2 |
|  |  | 2 | 0 | 0 | 0 | 0 | 4 | 1 | 0 | 1 | 1 | 0 | 0 | 0 | 0 | 1 | 3 | 3 | 0 | 0 | 0 | 1 |
|  |  | 1 | 2 | 0 | 0 | — | 1 | 0 | 0 | 0 | 1 | 0 | — | 0 | 0 | 0 | 1 | 0 | — | 4 | 4 | 4 |
| 2-chlorophenyl | H | 4 | 0 | 3.4 | 4 | 1.3 | 4 | 4 | 2.3 | 4 | 4 | 2.3 | 4 | 4 | 4 | 4 | 4 | 4.5 | 3 | 4 | 4 | 4 |
|  |  | 2 | 0.3 | 3.5 | 0.3 | 0.7 | 4 | 3.7 | 1.3 | 4 | 3.7 | 2.5 | 2.7 | 1.7 | 2.5 | 2.3 | 3.3 | 1 | 4 | 3.7 | 4 | 4 |
|  |  | 1 | 0 | 2 | 0.5 | 0 | 2.5 | 3.5 | 0 | 3 | 2.5 | 0 | 1.5 | 1.5 | 0.5 | 0.5 | 2 | 0 | 1.7 | 1.5 | 0 | 2.5 |
|  |  | ½ | 0 | 1 | 0 | 0 | 2 | 0 | 0 | 1 | 0 | 0 | 1.0 | 1.0 | 0 | 1 | 0 | 0 | 0 | 0 | 0 | 0 |
| 2-bromophenyl | H | 4 | 0 | 0 | 0 | 1 | 4 | 4 | 2 | 4 | 4 | 1.3 | 4 | 4 | 3 | 4 | 4 | 3 | 2.5 | 4 | 4 | 4 |
|  |  | 2 | 0 | 2 | 0 | 0.5 | 4 | 3 | 0.5 | 4 | 2.5 | 0.5 | 4 | 2 | 1.5 | 2.3 | 2.4 | 2 | 1.5 | 3.5 | 3.5 | 3.5 |
|  |  | 1 | 1 | 0 | 0 | 2 | 4 | 1.5 | 0 | 3.5 | 1.5 | 1 | 1.5 | 0 | 0.5 | 0.5 | 0 | 0.5 | 0 | 1.5 | 1.5 | 1.5 |
|  |  | ½ | 0 | 0 | 0 | 0 | 2 | 0 | 0 | 1 | 0 | 0 | 0 | 0 | 0 | 0 | 2.5 | 0 | 0 | 0 | 0 | 0 |
| 2-tolyl | H | 8 | 2 | 2.5 | 2.5 | 1.5 | 4 | 4 | 2.5 | 4 | 4 | 3.5 | 4 | 2.5 | 4 | 4 | 4 | 2.5 | 3.5 | 3.5 | 4 | 4 |
|  |  | 4 | 0.5 | 2 | 1 | 0.5 | 4 | 3 | 2.5 | 4 | 3.5 | 2 | 3 | 4 | 2.5 | 3 | 3.5 | 1 | 3.5 | 3.1 | 4 | 4 |
|  |  | 2 | 0 | 1 | 0 | 0.5 | 4 | 1.5 | 0 | 4 | 2 | 1 | 4 | 0 | 1 | 1 | 3.5 | 0 | 2 | 4 | 4 | 4 |
|  |  | ½ | 0 | 0 | 0 | 0 | 0 | 0 | 0 | 2 | 0 | 0 | 0 | 0 | 0 | 0 | 0 | 1 | 0 | 0 | 0 | 0 |
| 2-trifluoromethylphenyl | H | 4 | 0 | 1 | 1 | 0 | 3 | 2 | 2 | 3 | 2 | 1 | 4 | 4 | 1 | 0 | 4 | 0 | 3 | 4 | 4 | 4 |
|  |  | 2 | 0 | 1 | 0 | 0 | 2 | 3 | 0 | 3 | 1 | 0 | 3 | 0 | 0 | 3 | 3 | 1 | 1 | 2 | 3 | 3 |
| 2-ethylphenyl | H | 4 | 0 | 0 | 0 | 0 | 1 | 3 | 0 | 2 | 3 | 1 | 2 | 2 | 0 | 0 | 4 | 0 | 0 | 2 | 1 | 1 |
|  |  | 2 | 0 | 0 | 0 | 0 | 0 | 2 | 0 | 0 | 1 | 0 | 3 | 3 | 2 | 0 | 4 | 1 | 0 | 2 | 2 | 2 |
| 3-fluorophenyl | H | 4 | 0 | 2 | 1 | 0 | 1 | 3 | 1 | 2 | 2 | 0 | 1 | 1 | 0 | 0 | 3 | 1 | 0 | 0 | 0 | 0 |
|  |  | 2 | 0 | 1 | 0 | 0 | 0 | 1 | 0 | 1 | 0 | 0 | 0 | 0 | 0 | 0 | 3 | 0 | 0 | 0 | 0 | 0 |
| 3-bromophenyl | H | 4 | 0 | 2 | 2 | 0 | 4 | 3 | 2 | 2 | 2 | 1 | 2 | 0 | 0 | 0 | 4 | 1 | 0 | 2 | 2 | 2 |
|  |  | 2 | 0 | 1 | 0 | 0 | 2 | 1 | 0 | 0 | 1 | 0 | 1 | 0 | 0 | 0 | 3 | 1 | 0 | 0 | 0 | 0 |
| 3-tolyl | H | 4 | 3 | 2 | 2 | 3 | 4 | 3 | 3 | 2 | 2 | 2 | 3 | 2 | 0 | 3 | 4 | 2 | 4 | 3 | 3 | 3 |
|  |  | 2 | 1 | 1 | 0 | 1 | 2 | 2 | 1 | 1 | 1 | 0 | 2 | 1 | 0 | 1 | 2 | 1 | 2 | 2 | 2 | 2 |
| 3-chlorophenyl | H | 4 | 0 | 2 | 2 | 1 | 4 | 3 | 3 | 2 | 2 | 3 | 3 | 0 | 0 | 3 | 4 | 3 | 3 | 3 | 3 | 3 |
|  |  | 2 | 0 | 0 | 0 | 0 | 2 | 2 | 1 | 1 | 1 | 0 | 0 | 0 | 0 | 1 | 2 | 0 | 1 | 2 | 2 | 2 |
| 3-anisyl | H | 4 | 0 | 0 | 0 | 0 | 3 | 2 | 2 | 3 | 3 | 1 | 1 | 1 | 1 | 1 | 4 | 3 | 3 | 4 | 4 | 4 |
|  |  | 2 | 0 | 1 | 0 | 0 | 2 | 1 | 1 | 2 | 1 | 0 | 0 | 0 | 0 | 0 | 2 | 1 | 1 | 2 | 2 | 1 |
| 2,5-dichlorophenyl | H | 4 | 0 | 0 | 0 | 0 | 2.5 | 1.3 | 0.5 | 4 | 2.4 | 1.3 | 3.4 | 1.5 | 1.5 | 1.5 | 4 | 0.5 | 2 | 3 | 1.5 | 2.3 |
|  |  | 2 | 0 | 0 | 0 | 0 | 2 | 1 | 0.5 | 2 | 2 | 1 | 3.5 | 1.5 | 0.5 | 0.5 | 4 | 0 | 1 | 2 | 1 | 1.5 |
| 6-chloro-3-tolyl | H | 4 | 0 | 1 | 2 | 1 | 2 | 2 | 4 | 4 | 4 | 4 | 4 | 4 | 3 | 2 | 4 | 4 | 2 | 3 | 3 | 4 |
|  |  | 2 | 0 | 0 | 0 | 0 | 0 | 0 | 1 | 1 | 3 | 0 | 2 | 2 | 0 | 1 | 4 | 1 | 1 | 2 | 1 | 3 |
|  |  | 1 | 1 | 1 | 0 | 1 | 4 | 2 | 0 | 4 | 4 | 3 | 4 | 4 | 4 | 2 | 4 | 0 | 0 | 4 | 4 | 4 |
| 2,5-xylyl | H | 8 | 3 | 4.2 | 4.2 | 3 | 4 | 3.5 | 4 | 4 | 4 | 3.5 | 4 | 4.3 | 2.5 | 2 | 4 | 4.3 | 3.5 | 4 | 4 | 4 |
|  |  | 4 | 0.5 | 0.3 | 1.7 | 0.5 | 4 | 3.4 | 1.7 | 2.5 | 4 | 1 | 3.7 | 1.5 | 1.3 | 1 | 4 | 1.7 | 3.0 | 4 | 3.3 | 3.3 |
|  |  | 2 | 1 | 0 | 0 | 0 | 4 | 2 | 0.5 | 2.5 | 1 | 0.5 | 0.5 | 3 | 0.5 | 0.5 | 4 | 0.5 | 0.5 | 1 | 3 | 2 |
|  |  | ½ | 0 | 0 | 0 | 0 | 0 | 0 | 0 | 0 | 0 | 0 | 0 | 0 | 0 | 0 | 0 | 0 | 0 | 0 | 0 | 0 |

Based upon the above results, the following group of compounds form a preferred subclass because of their outstanding broad spectrum herbicidal activity:

α,α-Diethynyl-2-chlorobenzyl alcohol
α,α-Diethynyl-2-bromobenzyl alcohol
α,α-Diethynyl-2-methylbenzyl alcohol
α,α-Diethynyl-3-methylbenzyl alcohol
α,α-Diethynyl-2,5-dimethylbenzyl alcohol
α,α-Diethynyl-2-methyl-5-chlorobenzyl alcohol The acetates of the above benzyl alcohols are equally active as herbicides and are included within our preferred subclass.

According to our novel process, a compound represented by the above formula is applied in a suitable formulation such as that previously described at the rate of from ½ to 16 lbs. per acre to areas to which it is desired to control the growth of seedling grasses or seedling broad leaf plants. For this purpose, the herbicidal compound is preferably applied pre-emergent to the vegetaiton whose elimination is desired. The compounds can be used for their heribicidal effect, as with other pre-emergent herbicides, in areas in which crops are already established and growing such as tomato fields, orchards, corn or cotton fields, established lawns, and the like. Although the compounds have comparatively little herbicidal atcivity against established plants, it is nevertheless usually desirable to apply the compounds to the crop area in narrow bands so as to avoid contact between the herbicide and the established crop.

Other formulations such as emulsifiable concentrates, granules, etc., such as are commonly employed by those skilled in the art can also be prepared and used as pre-emergent herbicides according to the processes of this invention.

The compounds of this invention are prepared by reacting a substituted benzoate ester with sodium acetylide in liquid ammonia. The following examples will serve to further illustrate the general procedure for the preparation of the compounds of the invention, but are not meant to limit its scope in any manner.

EXAMPLE I

A stirred solution of 141 g. of phenol and 308 g. of pyridine in 2500 ml. of methylene chloride was treated dropwise with 200 g. of 2-methylbenzoyl chloride with external cooling. After the addition of the chloride was complete, the mixture was stirred for an additional 4 hours at ice bath temperature and then at room temperature for an additional 18 hours. The resulting mixture was washed sequentially with water, 10 percent hydrochloric acid, 10 percent sodium hydroxide, and water. The organic layer was separated and dried with anhydrous magnesium sulfate; the solvents were removed in vacuo; and the resulting product, phenyl 2-methylbenzoate, was distilled: B.P.=115–120° C./0.2 mm. Hg. Yield=261.3 g. (94%).

A liquid ammonia solution containing 2.5 moles of sodium acetylide was prepared by adding 57.5 g. of sodium to an excess of acetylene gas in 3000 ml. of liquid ammonia. 106 g. of phenyl 2-methylbenzoate prepared as above was dissolved in 750 ml. of methylene chloride and the solution added dropwise to the sodium acetylide solution over a one-hour period. The mixture was stirred for 4 hours, while acetylene was slowly introduced, after which time 1.5 l. of ether were added and the ammonia was allowed to evaporate. After the reaction mixture had attained room temperature, 100 g. of crushed ice were added slowly until the vigorous reaction caused by their addition had ceased. 400 ml. of water was next added. The organic layer was separated and washed 3 times with 300 ml. portions of water, dried with anhydrous magnesium sulfate, and the solvent was removed in vacuo. The residual liquid was distilled: B.P.=80–4°

C./0.3 mm. Hg. The product, α,α-diethynyl-2-methylbenzyl alcohol, weighed 22 g. (25.9%).

*Analysis.*—Calc. (percent): C, 84.68; H, 5.92. Found (percent): C, 84.40; H, 5.74.

Additional compounds which are prepared by the above method include:

α,α-Diethynyl-2-chlorobenzyl alcohol,
    B.P.=122–6° C./4 mm. Hg.
α,α-Diethynyl-2-bromobenzyl alcohol,
    B.P.=86–8° C./0.1 mm. Hg.
α,α-Diethynyl-3-methylbenzyl alcohol,
    B.P.=78–80° C./0.1 mm. Hg.
α,α-Diethynyl-2,5-dimethylbenzyl alcohol,
    B.P.=79–84° C./0.07 mm. Hg.
α,α-Diethynyl-2-methyl-5-chlorobenzyl alcohol,
    M.P.=80–2° C.
α,α-Diethynylbenzyl alcohol,
    B.P.=104° C./4 mm. Hg.
α,α-Diethynyl-2-fluorobenzyl alcohol,
    B.P.=65–70° C./0.3 mm. Hg.
α,α-Diethynyl-2-trifluoromethylbenzyl alcohol,
    B.P.=72–5° C./0.2 mm. Hg.
α,α-Diethynyl-2-ethylbenzyl alcohol,
    B.P.=100–6° C./0.3 mm. Hg.
α,α-Diethynyl-3-fluorobenzyl alcohol,
    B.P.=52–4° C./0.05 mm. Hg.
α,α-Diethynyl-3-bromobenzyl alcohol,
    B.P.=80–3° C./0.1 mm. Hg.
α,α-Diethynyl-3-chlorobenzyl alcohol,
    B.P.=70–2° C./0.05 mm. Hg.
α,α-Diethynyl-3-methoxybenzyl alcohol,
    B.P.=95–100° C./0.1 mm. Hg.
α,α-Diethynyl-2,5-dichlorobenzyl alcohol,
    M.P.=116–8° C.
α,α-Diethynyl-2-chloro-5-methylbenzyl alcohol,
    B.P.=120–3° C./0.1 mm. Hg.
α,α-Diethynyl-2,4-dimethylbenzyl alcohol,
    B.P.=95–100° C./0.1 mm. Hg.

EXAMPLE II 5.9 g. of acetyl chloride were added dropwise to a solution containing 10 ml. of pyridine and 10.2 g. of α,α-diethynyl-2-methylbenzyl alcohol in 100 ml. of methylene chloride. The reaction mixture was cooled with an ice-water bath during the addition. After the addition was completed, the cooling bath was removed and the reaction mixture stirred at ambient temperature for about 24 hours. The reaction mixture was then washed successively with water, 10% hydrochloric acid, saturated sodium bicarbonate solution and then water. The organic layer was separated and dried; the solvent removed by evaporation in vacuo; and the residual oil distilled in vacuo. α,α-Diethynyl-2-methylbenzyl acetate thus prepared distilled at 95–8° C./0.1 mm. Hg.

*Analysis.*—Calc. (percent): C, 79.22; H, 5.70. Found (percent): C, 78.98; H, 6.03.

α,α-Diethynyl-2-chlorobenzyl acetate was prepared by reacting acetyl chloride and α,α-diethynyl-2-chlorobenzyl alcohol according to the above procedure. The acetate distilled at 103–5° C./0.1 mm. Hg.

α,α-Diethynyl-2-methylbenzyl cyclopropane carboxylate was prepared by the above procedure, but cyclopropane carboxyl chloride was substituted for acetyl chloride. The cyclopropane carboxylate melted at about 70–72° C.

We claim:
1. A method of controlling the growth of plants which comprises applying to an area infested with plant seeds and seedling plants an effective amount of a compound according to the formula

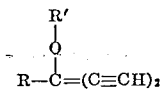

wherein R is phenyl, 2,4-xylyl,

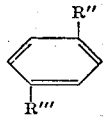

wherein R″ is halo, trifluoromethyl, or $C_1$–$C_3$ alkyl and R‴ is halo, hydrogen or $C_1$–$C_3$ alkyl, or

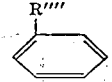

wherein R″″ is halo, $C_1$–$C_3$ alkyl or $C_1$–$C_3$ alkyloxy, and wherein R′ is hydrogen, $C_1$–$C_4$ alkanoyl or cyclopropane carbonyl.

2. A herbicidal process according to claim 1 in which α,α-diethynyl-2,5-dimethylbenzyl alcohol is the herbicidally active ingredient.

3. A herbicidal process according to claim 1 in which α,α-diethynyl-2-methylbenzyl alcohol is the herbicidally active ingredient.

4. A herbicidal process according to claim 1 in which α,α-diethynyl-2-chlorobenzyl alcohol is the herbicidally active ingredient.

5. A process according to claim 1 in which the herbicide is applied at the rate of 0.5 to 16 lbs. per acre.

References Cited

UNITED STATES PATENTS

| | | | |
|---|---|---|---|
| 3,235,577 | 2/1966 | Adams et al. | 71—106 |
| 3,348,939 | 10/1967 | Gien | 71—106 |
| 3,082,242 | 3/1963 | Miller et al. | 71—106 |
| 3,535,386 | 10/1970 | Dillard | 71—122 |

OTHER REFERENCES

Noltes et al., Rec. Trav. Chim., 81, 41–8 (1962).

JAMES O. THOMAS, JR., *Primary Examiner*

U.S. Cl. X.R.

71—106; 260—488 CD, 618 E, 618 D

PO-1050
(5/69)

UNITED STATES PATENT OFFICE
CERTIFICATE OF CORRECTION

Patent No. 3,794,480                Dated February 26, 1974

Inventor(s) Robert D. Dillard and Donald E. Pavey

It is certified that error appears in the above-identified patent and that said Letters Patent are hereby corrected as shown below:

Column 3, line 1, in the Table, the 10th line under Zinnia, "44" should read --4--.

Column 4, line 1, in the Table, the 44th line under Zinnia, "4" should read --3--.

Column 5, line 1, in the Table, the 63rd line under Zinnia, "3" should read --2--.

Column 5, line 1, in the Table, the 64th line under Zinnia, "3" should read --1--.

Signed and sealed this 17th day of September 1974.

(SEAL)
Attest:

McCOY M. GIBSON JR.
Attesting Officer

C. MARSHALL DANN
Commissioner of Patents